(12) United States Patent
Thakkar et al.

(10) Patent No.: US 11,882,985 B2
(45) Date of Patent: Jan. 30, 2024

(54) SMART INDUSTRIAL VACUUM CLEANER TO REDUCE FOREIGN OBJECT DEBRIS

(71) Applicant: The Boeing Company, Chicago, IL (US)

(72) Inventors: Rahul C. Thakkar, Leesburg, VA (US); Robert John Rencher, Normandy, WA (US); Surya Pandrangi, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 16 days.

(21) Appl. No.: 17/527,827

(22) Filed: Nov. 16, 2021

(65) Prior Publication Data

US 2022/0167813 A1 Jun. 2, 2022

Related U.S. Application Data

(60) Provisional application No. 63/119,278, filed on Nov. 30, 2020.

(51) Int. Cl.
*A47L 9/28* (2006.01)

(52) U.S. Cl.
CPC .......... *A47L 9/2815* (2013.01); *A47L 9/2852* (2013.01); *A47L 2201/04* (2013.01); *A47L 2201/06* (2013.01)

(58) Field of Classification Search
CPC ........ A47L 9/281; A47L 9/2805; A47L 9/102; A47L 9/104; A47L 2201/06; A47L 9/2852; A47L 9/2815
See application file for complete search history.

(56) References Cited

U.S. PATENT DOCUMENTS

| 8,378,613 | B2 | 2/2013 | Landry et al. | |
| 11,339,580 | B2 * | 5/2022 | Braidic | E04H 4/1654 |
| 2012/0167331 | A1 * | 7/2012 | Pruiett | A47L 9/2805 |
| | | | | 15/319 |
| 2015/0150429 | A1 * | 6/2015 | Yoo | A47L 11/4011 |
| | | | | 173/4 |
| 2016/0135655 | A1 * | 5/2016 | Ahn | G05D 1/0044 |
| | | | | 15/319 |
| 2017/0319033 | A1 * | 11/2017 | Hyun | A47L 9/1641 |
| 2019/0387943 | A1 * | 12/2019 | Kim | A47L 9/2842 |
| 2020/0009732 | A1 * | 1/2020 | Gordon | G08B 21/24 |
| 2021/0021479 | A1 * | 1/2021 | Chandran | H04L 41/5054 |

(Continued)

FOREIGN PATENT DOCUMENTS

CN 110522359 A * 12/2019 .............. A47L 11/24
WO WO-2021149879 A1 * 7/2021

*Primary Examiner* — Andrew A Horton
(74) *Attorney, Agent, or Firm* — FERGUSON BRASWELL FRASER KUBASTA PC

(57) ABSTRACT

A vacuuming device. The device includes a sensor connected to at least a suction head, and is configured to sense a parameter of foreign object debris (FOD) in the suction head. The device also includes a positioning sensor connected to the suction head and configured to ascertain a position of the suction head within an area in which the device is located. The device also includes a computer in communication with the sensor and the positioning sensor. The computer is programmed to classify the FOD using the parameter, and use the position of the suction head to determine a pick-up location of the FOD.

20 Claims, 9 Drawing Sheets

(56) References Cited

U.S. PATENT DOCUMENTS

2021/0093145 A1* 4/2021 Kim ...................... A47L 11/282
2021/0187732 A1* 6/2021 Chae ....................... B25J 9/163
2021/0386260 A1* 12/2021 Horn ...................... A47L 11/00

* cited by examiner

SMART INDUSTRIAL VACUUM CLEANER TO REDUCE FOREIGN OBJECT DEBRIS

RELATED APPLICATIONS

This application claims priority to U.S. Provisional Patent Application 63/119,278, filed Nov. 30, 2020, the entirety of which is hereby incorporated by reference.

BACKGROUND

Foreign object debris (FOD) are physical objects that are out of place in a defined setting, such as a manufacturing floor, a vehicle, a laboratory, or some other controlled area. FOD includes trash, shavings, dust, detritus, etc., that is out of place. However, FOD also includes desirable objects that are out of place. For example, if a useful tool, like a wrench, is dropped on the manufacturing floor and not put back in its proper place, then the tool is considered FOD even though the wrench later will be put back in its proper place for re-use. FOD is any out-of-place object in a controlled area. Examples of FOD include, but are not limited to tools, parts, hardware, building materials, paper, pens, coins, badges, fragments of material, trash, food wrappers, rocks, vegetation, liquids, animals, ash, dust, shavings, etc.

FOD can be problematic for a number of reasons. FOD may result in waste during a manufacturing process, which results in undesirable expenses. FOD may result in other issues that are undesirable in an operational context.

SUMMARY

The one or more embodiments provide for a vacuuming device. The device includes a sensor connected to at least a suction head, and is configured to sense a parameter of foreign object debris (FOD) in the suction head. The device also includes a positioning sensor connected to the suction head and configured to ascertain a position of the suction head within an area in which the device is located. The device also includes a computer in communication with the sensor and the positioning sensor. The computer is programmed to classify the FOD using the parameter, and use the position of the suction head to determine a pick-up location of the FOD.

The one or more embodiments also provide for a method. The method includes vacuuming an area using a vacuum machine. The vacuum machine includes a negative pressure source, a vacuum head connected to the negative pressure source, and a sensor connected to the vacuum machine. Vacuuming picks up foreign object debris (FOD) into the vacuum machine. The area includes stations. The method also includes sensing, with the sensor, a parameter of the FOD. The method also includes formatting the parameter as a data structure. The method also includes identifying, using a computer analyzing the data structure, a category of the FOD. The method also includes recording, using the computer, a location of the FOD. The method also includes receiving, using the computer, data describing the stations. The method also includes identifying, using a combination of the category of the FOD, the location of the FOD, and the data describing the stations, a first station within the stations for evaluation of a modification to an operational procedure performed at the first station.

Other aspects of the one or more embodiments will be apparent from the following description and the appended claims.

DETAILED DESCRIPTION

Figure 1:
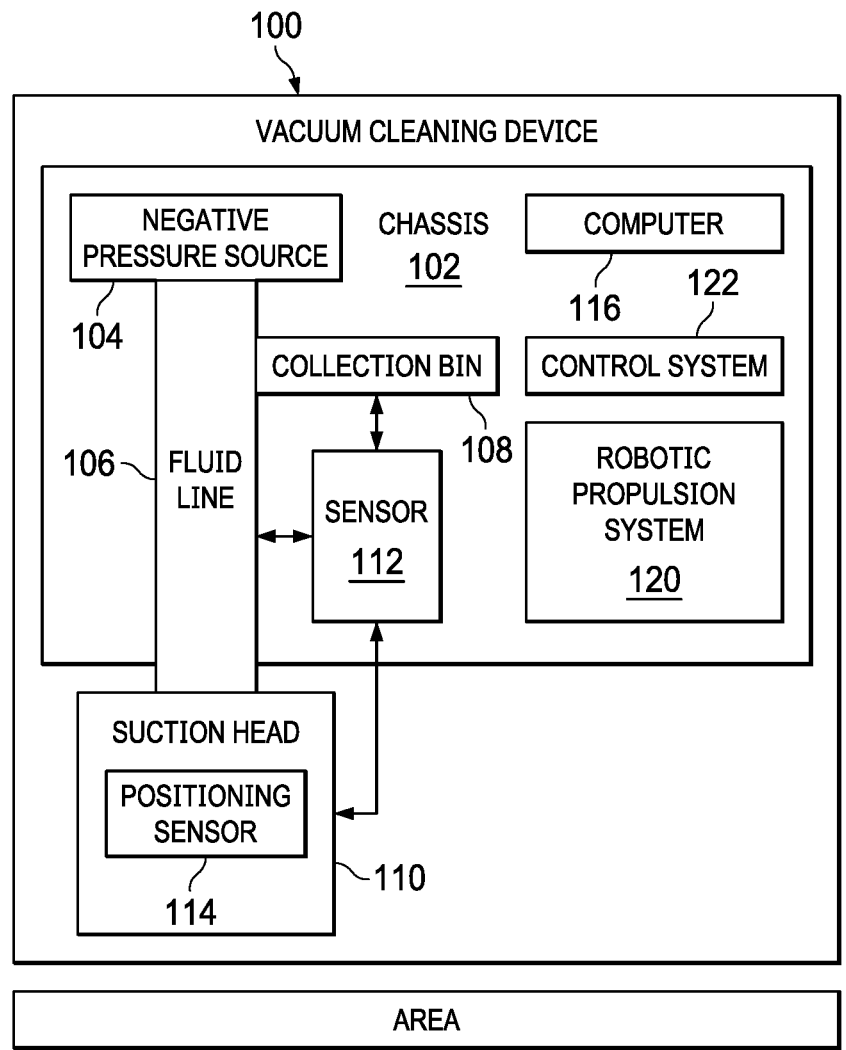
FIG. 1 shows a vacuum cleaning device, in accordance with one or more embodiments.

Specific embodiments of the one or more embodiments will now be described in detail with reference to the accompanying figures. Like elements in the various figures are denoted by like reference numerals for consistency.

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process. In other words, the bottom and the wall, in being "connected to" each other, could be separate components that are brought together and joined, or may be a single piece of material that is bent at an angle so that the bottom panel and the wall panel are identifiable parts of the single piece of material.

In general, one or more embodiments relate to using machine learning to categorize FOD picked up by an improved industrial vacuum cleaner. The one or more embodiments also relate to using the machine-learned categorization of the FOD to improve a manufacturing environment. The one or more embodiments also relate to the operation of vehicles, such as aircraft, automobiles, helicopters, submarines, etc. where the collection and classification of FOD may be useful.

The one or more embodiments use one or more sensors (such as object sensors, metal sensors, and counting sensors) to gather data about FOD collected by a vacuum machine. The sensors report the number of objects, their size, their shape, and their composition (e.g., metallic, plastics, etc.) that were captured by the vacuum cleaner, as well as the locations where the objects were collected. The sensors further record other data, such as the time captured to sub-second accuracy, and the frequency of object capture.

Thus, a spatial and temporal map of the operation of a vacuum machine can be created, along with a map of what kind of FOD was picked up and where the FOD was picked up. Various products, and reports can be produced from such data by application of analytics, artificial intelligence, machine learning, or deep learning algorithms. The resulting output can then be used as insights to track the source of FOD generation by, for example, analyzing which station in a factory produces what type of FOD at what rate.

An aspect of the one or more embodiments is a machine learning model that evaluates patterns within FOD collection and smart vacuum machine utilization patterns. Such output can be used to provide recommendations on smart vacuum machine application to further reduce FOD by focusing on hot spots on the floor (i.e., where FOD is most likely). The machine learning model can also correlate the type of work being performed, along with the work shifts of technicians, to FOD accumulation hot spots. In this manner, processes, actions, and training can be identified and implemented to reduce FOD production.

Attention is now turned to the figures. FIG. 1 shows a vacuum cleaning device (100), in accordance with one or more embodiments. The vacuum cleaning device (100) includes a chassis (102). The chassis (102) is the base frame of the vacuum cleaning device (100). The chassis (102) could also be referred-to as a housing in some embodiments.

In any case, the chassis (102) is the base frame to which operational components of the vacuum cleaning device (100) are attached either internally or externally with respect to the chassis (102). The chassis (102) may define many different kinds of the vacuum cleaning device (100). The vacuum cleaning device (100) could be hand-held, or could be a robotic machine the size of a large truck. The vacuum cleaning device (100) could be autonomous, industrial, manually pushed, automatically driven, worn as a backpack, etc.

A negative pressure source (104) is attached to the chassis (102). The negative pressure source (104) is configured to cause air or other fluid to be sucked towards the negative pressure source (104). In other words, the negative pressure source (104) is the mechanism by which the vacuum cleaning device (100) can create a suction force. Examples of the negative pressure source (104) include an air pump, and a motor with blower, though other mechanisms are contemplated.

A fluid line (106) is connected to the negative pressure source (104). The fluid line (106) is a hose, pipe, or other fluid line through which fluid can flow when the negative pressure source (104) is actuated. Examples of fluids include air, water, etc.

A collection bin (108) is connected to the fluid line (106). The collection bin (108) is a bag or chamber in fluid communication with the fluid line (106). The collection bin (108) is disposed such that FOD (again, foreign object debris) sucked into the fluid line (106) is deposited into the collection bin (108) before entering the negative pressure source (104). As a common reference, the collection bin (108) could be a bag or dust bin in a vacuum cleaner, though in the vacuum cleaning device (100), the collection bin (108) may be a more complicated structure. For example, the collection bin (108) may have different compartments with differently sized openings so that FOD sucked through the fluid line (106) is sorted by object size or state of matter. Thus, for example, fluid may be collected in one compartment, and objects sorted according to size or composition deposited in other compartments.

A suction head (110) is also connected to the fluid line (106). The suction head (110) is shown as disposed outside the chassis (102); however, in other embodiments, the suction head (110) could be disposed inside the chassis (102) but externally facing. A portion of the fluid line (106) may also be disposed outside the chassis (102), as in the case where a hose extends from the chassis (102) and terminates in the suction head (110). As an example of an internally disposed suction head (110), the suction head (110) may be disposed underneath a robot such that the outer surface of the suction head (110) is at or near the outer surface of the underside of the robot. In this case, as the robot passes over the floor, the suction head (110) is operably disposed with respect to the floor. Thus, the suction head (110) may take a variety of different forms and may be internal or external to the chassis (102). The suction head (110) may have a variety of different shapes, and may be larger, smaller, and/or differently shaped in cross-section than the fluid line (106).

The vacuum cleaning device (100) also includes a sensor (112) connected to at least one of the fluid line (106), the collection bin (108), and the suction head (110). The sensor (112) is configured to sense a parameter of foreign object debris (FOD) in the at least one of the fluid line (106), the collection bin (108), and the suction head (110). Note that while the term "sensor," in the singular, is used, the sensor (112) contemplates the presence of multiple sensors of varying types. Thus, for example, the sensor (112) could refer to twenty sensors (or more or fewer) distributed among the fluid line (106), the collection bin (108), and the suction head (110) for collecting a variety of different kinds of data regarding the FOD collected via the suction head (110), sucked through the fluid line (106), and deposited in the collection bin (108).

The types and arrangements of various sensor suites for the collection bin (108) are now presented. The sensor may be a position sensor, such as an inertial measurement unit (IMU) used to measure the position of the suction head (110) and/or the chassis (102) to a desired accuracy with respect to a coordinate system within the area being vacuumed. For example, using an IMU, the position of the suction head (110) may be determined to centimeter accuracy so that the precise location of collected FOD can be determined, though higher or lower accuracy settings are possible. The coordinate system may be specified relative to a reference point on a factory floor, or may be specified in a known geographic coordinate reference system using cardinal directions and elevation, or longitude, latitude, and elevation for example.

The sensor (112) may also include an electro-optical (EO) sensor, such as a high-speed color camera, a high speed infrared camera, a high speed multi-spectral camera, etc. The term "high speed" means that the frame rate of the camera is sufficiently high that FOD moving into the suction head (110) or through the fluid line (106) can be optically resolved to a desired level of accuracy. Stated differently, "high speed" means that the camera can take, from a human perspective, clear pictures of FOD moving at speeds approaching the speed of the fluid being sucked through the suction head (110). The electro-optical sensor(s) thus take one or more of microwave, infrared, visible light, ultraviolet, or even X-ray measurements of the FOD as the FOD interacts with the vacuum cleaning device (100). Such optically-based data will later be used in classifying the FOD, as explained with respect to FIG. 2A through FIG. 3.

The sensor (112) may also include a metal detector. The metal detector senses disturbances in an electrical and/or magnetic field. In this manner, the sensor (112) can be used to determine when metal FOD is collected by the vacuum cleaning device (100).

The sensor (112) may also include velocity sensors, such as a RADAR (radio detection and ranging) device. Thus, information can be collected regarding the speed of FOD as the FOD travels into and through the vacuum cleaning device (100).

The sensor (112) may also include a LiDAR (light detecting and ranging) sensors that can be used to ascertain the shape of FOD. The shape of the FOD can also be used to classify the FOD, as explained further with respect to FIG. 2A through FIG. 3.

The sensor (112) may also include a clock. The clock may record the time when individual FOD is detected. Thus, when a FOD is detected, a time stamp is assigned to that FOD. The accuracy of the clock may be set to a desirable time, though in some embodiments times measured to a tenth of a second may be deemed of sufficient accuracy. However, more accurate or less accurate time stamps are possible.

The sensor (112) may be other types of sensors. Thus, the one or more embodiments are not necessarily limited to the example sensors described above. Nevertheless, the sensor (112) is configured to measure a parameter (e.g., time of pickup, location of pickup, size of FOD, shape of FOD, composition of FOD, state of FOD, etc.) with respect to the FOD.

The sensor (112) may be physically attached to the chassis (102), the suction head (110), or it may not be physically attached to these. The sensor (112) may be present in the area (118) or it may be positioned to monitor the area (118), or to monitor the vacuum cleaning device (100).

The vacuum cleaning device (100) also includes a positioning sensor (114) connected to the suction head (110). The term "connected to the suction head" means disposed in a manner to determine a position of the suction head (110), not necessarily directly connected to the suction head (110). The positioning sensor (114) is configured to ascertain a position of the suction head (110) within an area (118) in which the vacuum cleaning device (100) is located.

The vacuum cleaning device (100) also includes a computer (116). Alternatively, the computer (116) may be external to and remote from the chassis (102). The computer (116) may be part of the computing system shown in FIG. 8A and FIG. 8B. The computer (116) is in communication with the sensor (112) and the positioning sensor (114). The computer (116) is programmed to classify the FOD using the parameter measured by the sensor (112) according to the techniques described with respect to FIG. 2A through FIG. 3. The computer (116) is also programmed to use the position of the suction head to determine a pick-up location of the FOD according to the techniques described with respect to FIG. 2A through FIG. 3.

The vacuum cleaning device (100) may optionally include a robotic propulsion system (120) configured to drive the chassis (102). The robotic propulsion system (120) may be wheels, treads, blowers, etc. that may be used to propel the vacuum cleaning device (100) within the area (118).

The vacuum cleaning device (100) may also include a control system (122) configured to automatically follow a pre-determined path in the area (118) while vacuuming the FOD through the suction head (110). The control system (122) may take the form of actuators, motors, electronics, etc. used to control operation of the robotic propulsion system (120). The sensor (112) may use data from the positioning sensor (114) to determine the location of the vacuum cleaning device (100) within the area (118). The sensor (112) may also determine the types of FOD and the frequency of FOD that should be picked up more frequently. Knowing the location of the vacuum cleaning device (100) and parameters of the FOD, the computer (116) in conjunction with the control system (122) can determine a path to take within the area (118) to increase the efficiency of removing FOD. Additionally, using the same or similar information, the computer (116) may be programmed to use the pick-up location in combination with the parameter to classify the FOD. Additional details regarding these uses of the vacuum cleaning device (100) are described further with respect to FIG. 2A through FIG. 3.

While FIG. 1 shows a configuration of components, other configurations may be used without departing from the scope of the one or more embodiments. For example, various components may be combined to create a single component. As another example, the functionality performed by a single component may be performed by two or more components.

Figure 2A:
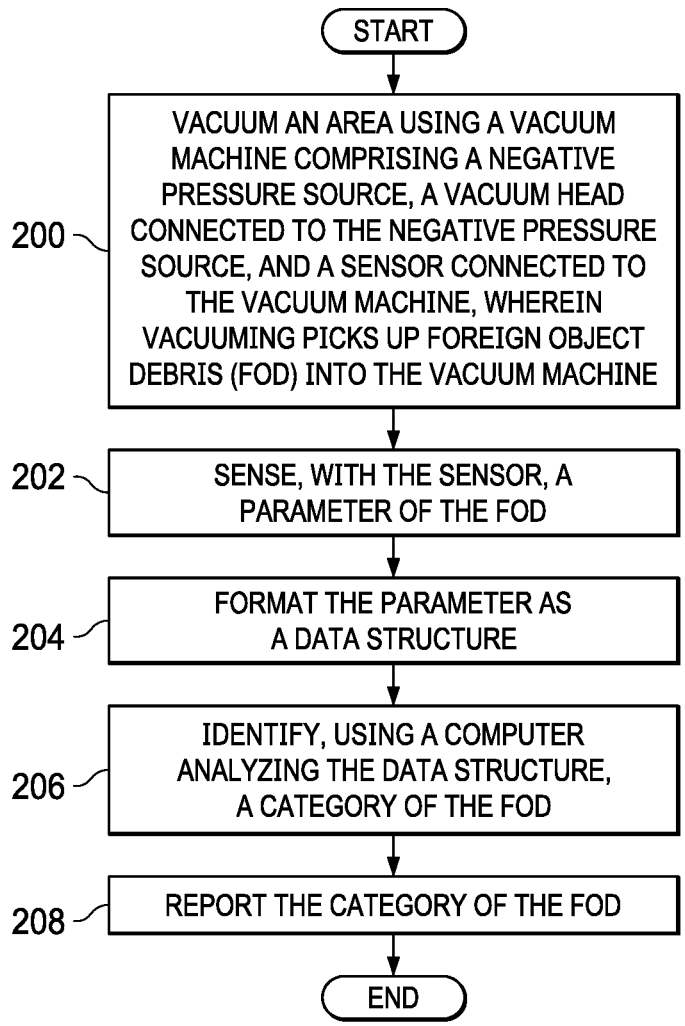
FIG. 2A, FIG. 2B, FIG. 2C, FIG. 2D, FIG. 2E, and FIG. 2F show a method of categorizing foreign object debris (FOD) retrieved by the vacuum cleaning device of FIG. 1, in accordance with one or more embodiments.
Figure 2B:
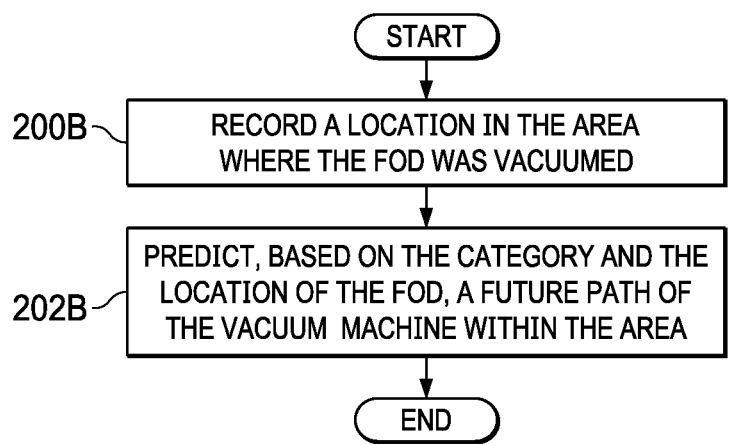
Figure 2C:
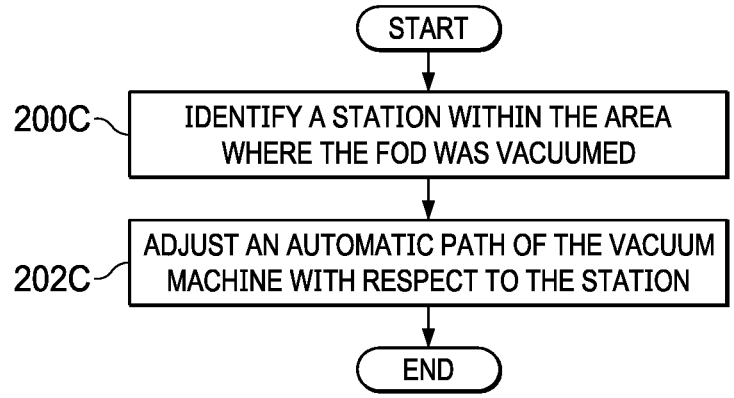
Figure 2D:
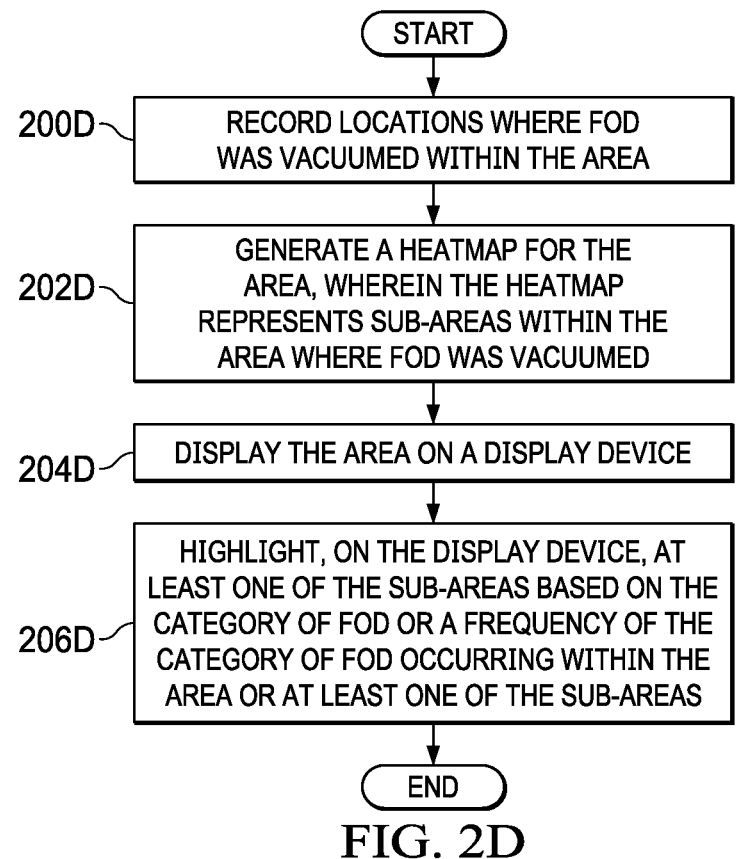
Figure 2E:
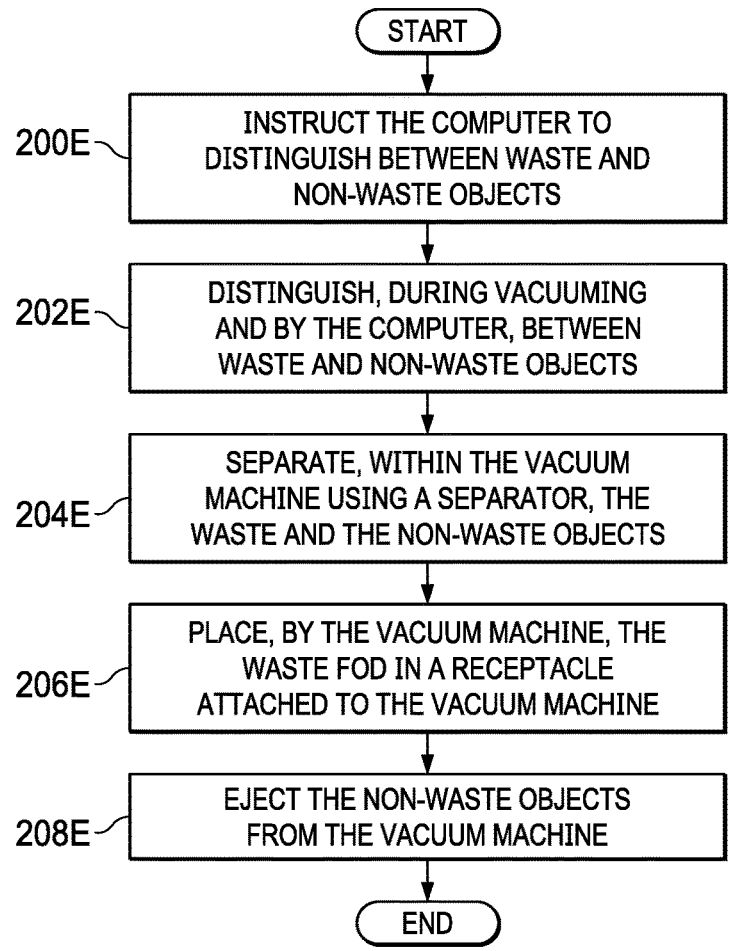
Figure 2F:
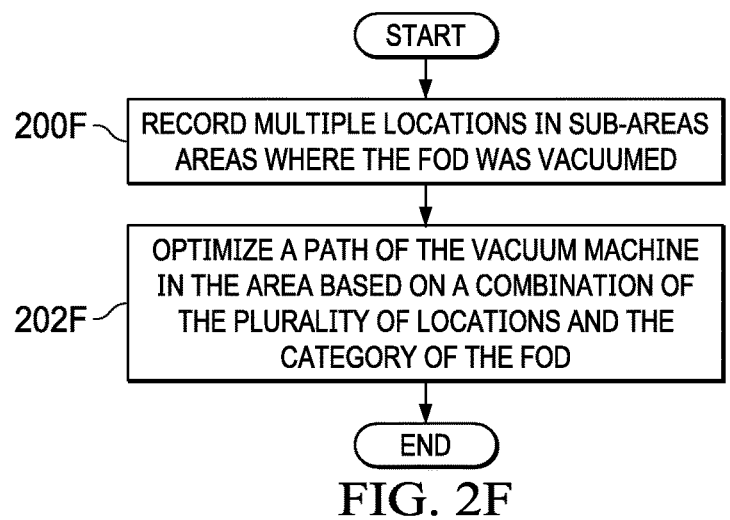
Figure 3:
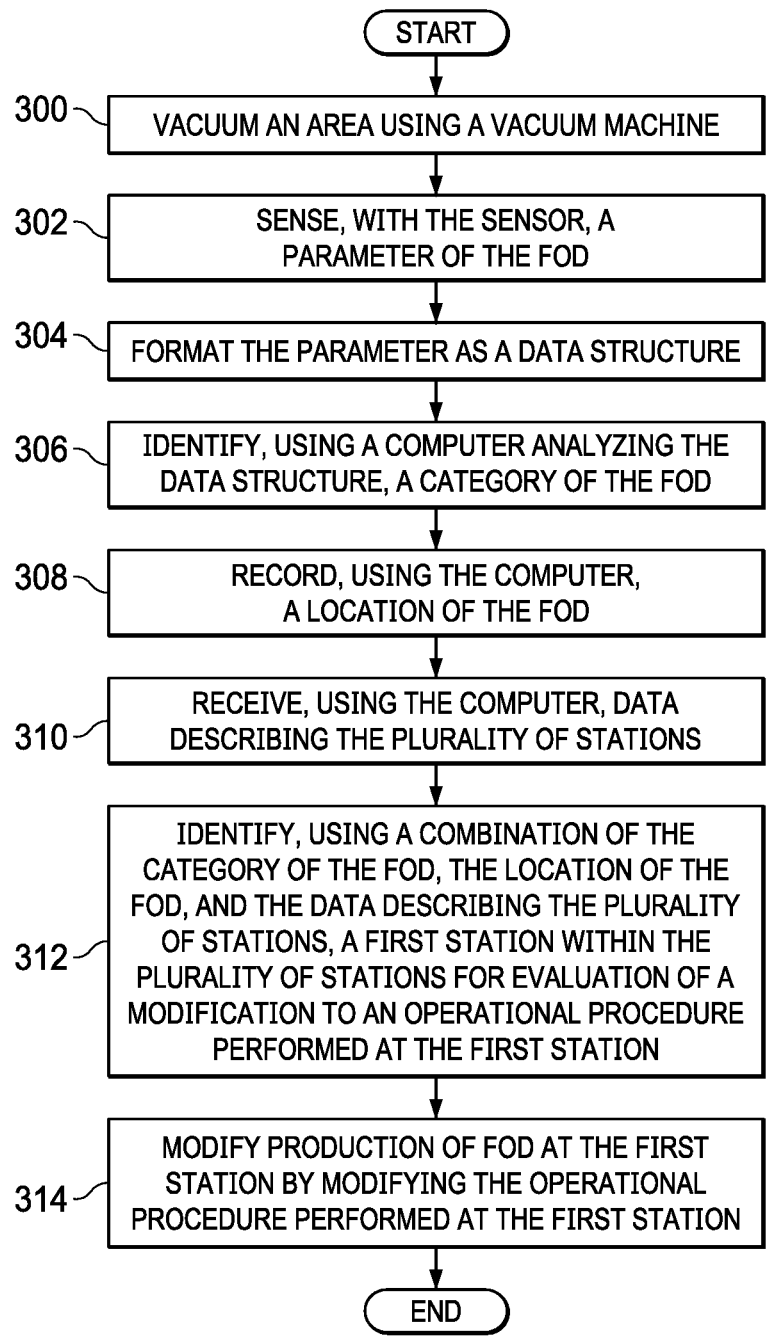
FIG. 3 shows a method of identifying a station producing foreign object debris (FOD) using the vacuum cleaning device of FIG. 1, in accordance with one or more embodiments.

FIG. 2A through FIG. 3 are flowcharts, in accordance with one or more embodiments. FIG. 2A, FIG. 2B, FIG. 2C, FIG. 2D, FIG. 2E, and FIG. 2F show a method of categorizing foreign object debris (FOD) retrieved by the vacuum cleaning device of FIG. 1, in accordance with one or more embodiments. FIG. 3 shows a method of identifying a station producing foreign object debris (FOD) using the vacuum cleaning device of FIG. 1, in accordance with one or more embodiments.

Attention is first turned to the method of FIG. 2A. At step 200, an area is vacuumed using a vacuum machine including a negative pressure source, a vacuum head connected to the negative pressure source, and a sensor connected to the vacuum machine. Vacuuming picks up foreign object debris (FOD) into the vacuum machine. Note vacuuming an area includes vacuuming some or all of the area. Note also that vacuuming "into" the vacuum machine contemplates vacuuming FOD into the suction head, but depositing the FOD in some location outside of the vacuum machine.

At step 202, a parameter of the FOD is sensed with the sensor. The parameter is sensed according to the type of the sensor. For example, an optical camera may detect photons reflected off the FOD. A thermal sensor may measure a temperature of FOD. A clock may record a time stamp of when FOD entered one or more of the various parts of the vacuum machine. A location sensor may record where the vacuum machine, or an individual part of the vacuum machine, is located when the FOD enters the vacuum machine. A LiDAR or RADAR device may determine the speed of FOD. A magnetic sensor may determine whether the FOD is made of metal (e.g., a Hall effect sensor). A pressure sensor may be used to determine whether the FOD is a solid, a gas, or a liquid. Many other parameters may be sensed.

At step 204, the parameter is formatted as a data structure. The data structure is a computer-readable and computer-storable structure for storing data. In an example, the parameter or parameters may be formatted a vector. A vector is a one-dimensional array composed of features and corresponding values for the features. A vector is particularly useful as a data structure that may be input into a machine learning model, as described further below. However, the data structure may take other forms, such as an ASCII file (ASCII stands for American Standard Code for Information Interchange), a binary file, a hierarchical JSON object, a tree, a table, a relational database, etc.

At step 206, a category of the FOD is identified using a computer analyzing the data structure. The category is a description or label applied to categorize the FOD. The category may be, for example, waste, non-waste, dust, liquid, metallic, plastic, etc. FOD that is waste is composed of one or more objects that are to be disposed or eliminated. FOD that is non-waste is FOD that is to be recycled or otherwise returned to a location deemed by a technician to be proper.

The computer may analyze the data structure to identify the category through the use of one or more of automated rules, policies, or machine learning expressed as software. For example, software may analyze patterns in magnetic sensor readings (i.e., a parameter) and determine that the FOD is composed of a metallic substance, or at least includes a metallic substance. In another example, a deep learning machine learning model, such as a convolutional neural network, may analyze the data structure that stores data such as time, location, and size of the FOD and output a prediction that the FOD is wood shavings from a carpentry station in a manufacturing environment. In still another combined example, the machine learning model may output many predictions that the FOD falls into a number of different categories, and a rule or policy may select a category for the FOD when the category is predicted by the machine learning model with a probability above a threshold probability.

The one or more embodiments thus contemplate the use of machine learning to classify FOD. In general, a machine learning model is a mathematical algorithm expressed as a software program which finds patterns in input data and outputs, based on those patterns, a probability that a particular pattern has matched. For example, a large amount of information in the form of a vector is provided to the machine learning model as input, and as output many categories are output. A probability is calculated that a given input results in a given category. Thus, for example, the output of a classification-based machine learning model may be a series of probabilities that the FOD is metallic, plastic, dust, liquid, etc., or some other category such as a tool or scrap, or still some other category such as waste or non-waste. A probability may be assigned to every such category. Generally, the category with the highest associated probability, or above a threshold probability, is selected as the category or categories to be assigned to the FOD.

Additionally, multiple machine learning models may be used. For example, machine learning can be used to categorize the FOD, as described above, but then an additional machine learning model can be used to determine additional useful information. For example, based on the categorization, time of pick-up, and location of pick-up, another machine learning model can determine probabilities that FOD production of a particular type is most likely to occur in certain specific areas at specific times in an area such as a manufacturing environment. Using such insights, the vacuum machine can be programmed with a path that more frequently visits 'hot spots' where FOD production is more likely or more frequent. Thus, the efficiency of the operational path of the vacuum machine may be maximized to a particular operational environment.

Yet further, the machine learning models or additional machine learning models may predict yet other useful information. For example, a machine learning model may be used to correlating the type of work being performed and the shifts and training of technicians with FOD accumulation hot spots. The resulting correlations may be used to identify processes and/or actions that likely lead to FOD production. With such information, specific stations may be identified within a manufacturing environment where FOD production is deemed unacceptably high, and remedial action taken to reduce FOD production. Likewise, policies and procedures during manufacturing may be modified, once the type, location, and timing of FOD production have been identified.

Returning to FIG. 2A, at step 208, the category of the FOD is reported. Reporting the FOD may be conducted in various different manners. The category of the FOD may be stored for later reference during additional processing. The category of the FOD may be displayed for review by a human technician. The category of the FOD may be used as input by another software process, including for example another machine learning model. Other forms of reporting the FOD are also contemplated.

In one embodiment, the method of FIG. 2A may terminate thereafter. However, as shown in FIG. 2A through FIG. 2F below, the method of FIG. 2A may be extended, modified, or take various different embodiments.

Thus, attention is turned to the variation of FIG. 2B. FIG. 2B may be performed after step 208 of FIG. 2A.

At step 200B, a location in the area where the FOD was vacuumed is recorded. The location may be recorded using the positioning sensor described with respect to FIG. 1.

At step 202B, a future path of the vacuum machine within the area may be predicted, based on the category and the location of the FOD. Stated differently, knowing the category of FOD and the location of the FOD, the path of the vacuum machine within the area.

The category of the FOD can change the predicted path of the vacuum machine. For example, if the FOD in sub-area A is liquid and the FOD in sub-area B is sawdust, then it may be desirable in some cases to pick up the FOD in sub-area B first in order to minimize the potential for clogging the vacuum machine as sawdust interacts with liquid inside the components of the vacuum machine.

The location of the FOD can also change the predicted path of the vacuum machine. For example, if FOD is more frequently detected in sub-area C relative to sub-area D, then the vacuum machine may be programmed to plot a more complete coverage course over sub-area C relative to sub-area D in order to maximize the time efficiency of the path of the vacuum machine. Alternatively, sub-area C may be vacuumed first, followed by sub-area D, followed again by sub-area C, given that sub-area C is known to produce more FOD.

The combination of the category of the FOD and the location of the FOD may also influence the path of the vacuum machine. In the above examples, it may be preferable to handle sub-area D first, because sub-area D has solid FOD, before sub-area C, and then to modify the path to handle sub-area B, followed by sub-area A last because sub-area A may contain liquid FOD.

Many other combinations and examples are possible. Thus, the example above does not necessarily limit the one or more embodiments.

Attention is now turned to the variation of FIG. 2C. The method of FIG. 2C may be performed after step 208 of FIG. 2A.

At step 200C, a station within the area where the FOD was vacuumed is identified. The station is a sub-area within the overall area being occupied. The station may also be where a specific task or sub-task is performed with respect to a manufacturing project undertaken in the area. The station where the FOD was vacuumed may be identified by identifying the location of FOD pickup and then comparing the location of FOD pickup to a table of stations. If the location of FOD pickup corresponds within a range of areas of a known station, then the station is identified as being associated with that particular FOD.

At step 202C, an automatic path of the vacuum machine with respect to the station is adjusted. For example, if more FOD is detected at a station, then the station may be scheduled for more intense or repeated coverage by the path of the vacuum machine. If little or no FOD is detected at a station, then the station may be scheduled for less intense or fewer passes by the path of the vacuum machine.

Attention is now turned to the variation of FIG. 2D. The method of FIG. 2D may be performed after step 208 of FIG. 2A.

At step 200D, locations where FOD was vacuumed within the area are recorded. The locations may be recorded by sensing, using a location sensor, where the suction head was located when the FOD is detected. The locations are stored in a data structure on a non-transitory computer readable storage medium.

At step 202D, a heatmap for the area is generated, wherein the heatmap represents sub-areas within the area where FOD was vacuumed. The heatmap is a map of the area, with shading, highlighting, colors, or lines indicating locations within the area where the FOD was recorded at step 200D. Additional colors or shading of the heat map may indicate the frequency of FOD, or possibly also the type of FOD picked up by the vacuum machine.

Thus, for example, at step 204D, the area may be displayed on a display device. Then, at step 206D, at least one of the sub-areas may be highlighted on the display device, based on the category of FOD or a frequency of the category of FOD occurring within the area or at least one of the sub-areas.

Attention is now turned to the variation of FIG. 2E. The method of FIG. 2E may be performed before and during step 200 of FIG. 2A.

At step 200E, prior to vacuuming, the computer is instructed to distinguish between waste and non-waste objects. For example, using a deep learning machine learning model such as a convolutional neural network, the FOD data can be treated as a mathematical classification problem. The combination of FOD size, shape, frequency, and material can be used to individually and automatically determine whether a FOD being collected is a wrench or a piece of scrap composite material.

Thus, at step 202E, a distinction between waste and non-waste objects can be made by the computer. For example, the machine learning model can predict a first probability that the FOD is waste and a second probability that the FOD is non-waste. If one of the first probability and the second probability exceed a pre-determined probability threshold, then the FOD is classified as waste or non-waste, accordingly.

Optionally, at step 204E, the waste and the non-waste objects can be separated within the vacuum machine using a separator. For example, a combination of filters, differently sized bins, and/or centrifuges can be used to separate waste FOD from non-waste FOD. In a specific example, it may be known that tools used in a manufacturing environment have a certain size range and have a known weight range. The size range and weight range can be used to separate objects according to their size and weight by using a filter, bin, or other separation system. While some waste FOD may appear in non-waste bins, more of the non-waste FOD is likely to be deposited in the non-waste bins, thereby increasing the ease of retrieving non-waste FOD for later re-use. The same procedure can be used to recapture material that can be recycled, such as certain plastics, metals, or composite materials.

Optionally, at step 206E, the waste FOD can be placed by the vacuum machine in a receptacle attached to the vacuum machine. For example, the waste FOD can be placed in a bag for later disposal.

Optionally, at step 208E, the non-waste objects can be ejected from the vacuum machine. For example, the non-waste objects can be ejected from the vacuum machine into one or more external storage bins where a technician can sort through the non-waste FOD and treat it accordingly. In a specific example, tools that were FOD can be retrieved, cleaned, and placed back where they belong. Recyclable materials can be recycled appropriately. However, it is not contemplated that the non-waste FOD be ejected back into the area, as to do so would create more FOD.

Attention is now turned to the variation of FIG. 2F. The method of FIG. 2F may be performed after step 208 of FIG. 2A. The method of FIG. 2F contemplates that vacuuming includes vacuuming the area substantially entirely.

At step 200F, multiple locations are recorded in sub-areas areas where the FOD was vacuumed. For example, the specific location of each element of FOD retrieved by the vacuum machine may be recorded. The locations may be classified according to sub-areas within the area, and/or by stations within the area.

At step 202F, a path of the vacuum machine is optimized in the area based on a combination of the plurality of locations and the category of the FOD. For example, knowing the locations and categories of the FOD, a path for the vacuum machine can be plotted to maximize the efficiency of FOD retrieval and to also minimize the time FOD is present within the area. For example, if FOD is known to be more frequent in one sub area, then the vacuum machine may be programmed to take a more circuitous path within that area to increase coverage and to spend more time in that sub area, relative to other sub-areas covered by the vacuum machine.

Still other variations are possible, in addition to the variations shown with respect to FIG. 2B through FIG. 2F. For example, in an embodiment the sensor is a light detection and ranging (LiDAR) sensor. In this case, the parameter includes a three-dimensional image of a sub-section of the FOD as the FOD moves within the vacuum machine.

In another variation, the sensor additionally includes an infrared (IR) sensor and a chemical sensor. In this case, the parameter additionally includes an infrared image of the FOD as the FOD moves within the vacuum machine. The parameter then additionally includes a chemical detected by the chemical sensor.

In another variation, the method may include comparing the parameter to a library of parameters. Then, the category may be assigned to the FOD based on a closest match of the parameter to an entry in the library.

Attention is now turned to some technical details of use of a machine learning model, as described above. As indicated above, the data structure is a vector. As an example, a parameter may be taken from an image of the FOD inside the vacuum machine. In this case, identifying the category of the FOD includes inputting the vector into a machine learning model (MLM) that is a deep learning neural network including a multi-layer perceptron. Then, using the MLM, features are extracted from the image using small squares within the image. Recall that a "feature" is an element of the one-dimensional vector.

In an embodiment, the MLM has multiple convolution layers, multiple pooling layers, and multiple fully connected layers. The convolution layers and the pooling layers together perform the step of extracting the features. The fully connected layers classify the FOD based on the parameter.

The one or more embodiments also contemplate training the MLM. Training a MLM is explained further with respect to FIG. 7. However, briefly, any of the methods of FIG. 2A through FIG. 2F may include training the MLM by performing additional operations prior to classifying FOD. The training method includes receiving a training image including known FOD. Then, the training image is input into an untrained MLM. An output classifying the FOD is generated based on the parameter. The output is compared to the known FOD. A loss function is generated based on a difference between the output and the known FOD. The untrained MLM is modified accordingly in an attempt to improve the MLM's prediction on a subsequent execution. The process is then repeated until convergence. Thus, the method includes repeating, until convergence, inputting, generating the output, comparing, generating the loss function, and modifying.

Attention is now turned to FIG. 3. FIG. 3 represents a method identifying where FOD is being produced. The method of FIG. 3 may be implemented using the vacuum cleaning device (100) of FIG. 1, together with the techniques described with respect to FIG. 2A through FIG. 2F.

At step 300, an area is vacuumed using a vacuum machine. The vacuum machine includes a negative pressure source, a vacuum head connected to the negative pressure source, and a sensor connected to the vacuum machine. The vacuum machine includes the sensors and processing capabilities described with respect to FIG. 1 through FIG. 2F. Vacuuming at step 300 picks up foreign object debris (FOD) into the vacuum machine. The area includes multiple stations.

At step 302, using the sensor, a parameter of the FOD is sensed. Sensing the parameter may be performed as described with respect to FIG. 2A, step 202.

At step 304, the parameter may be formatted as a data structure. Formatting the parameter may be performed as described with respect to FIG. 2A, step 204.

At step 306, a category of the FOD may be identified, using a computer analyzing the data structure. Identifying the category of the FOD may be performed as described with respect to FIG. 2A, step 206.

At step 308, a location of the FOD is recorded using the computer. The location of the FOD may be performed as described with respect to FIG. 2B, step 200B.

At step 310, data describing the plurality of stations is received, using the computer. For example, a data structure such as a table or tree may be used to represent an area as sub-areas. Each sub-area may be described according to some activity that takes place within a sub-area. For example, a sub-area may be identified as a milling station where milling of metal parts is performed. The fact that milling of metal parts is performed in that sub-area increases the likelihood that FOD in the form of metal shavings may be present. Thus, if metal shavings FOD is found in that area, then it may be concluded that the milling station is producing the metal shavings FOD. Other data about the station may be recorded, including times of operation, the identify of personnel working at the station at the times of operation, materials known to exist at the station, procedures used to perform manufacturing tasks at the station, and any other information of interest.

At step 312, an identification is performed, using a combination of the category of the FOD, the location of the FOD, and the data describing the plurality of stations, of a first station within the plurality of stations for evaluation of a modification to an operational procedure performed at the first station. For example, if FOD of a certain type is collected in the vacuum machine at the station, and the FOD exceeds some threshold amount, then the station may be identified for evaluation of a modification to an operational procedure.

At step 314, after identifying the first station, the production of FOD at the first station is modified by modifying the operational procedure performed at the first station. For example, a vent or additional vacuum source may be installed at the milling machine described above to collect metal shavings before the metal shavings become FOD. In another example, the operational procedure used to perform some manufacturing task may be modified to reduce the risk of producing FOD. In another example, personnel may be trained to reduce the risk of producing FOD. Many other examples exist of how to modify production of FOD by modifying the operational procedure performed at the identified station.

While the various steps in the flowcharts of FIG. 2A through FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps of computer processing may be performed using polling or be interrupt driven in accordance with one or more embodiments. By way of an example, determination steps during computer processing may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 4:
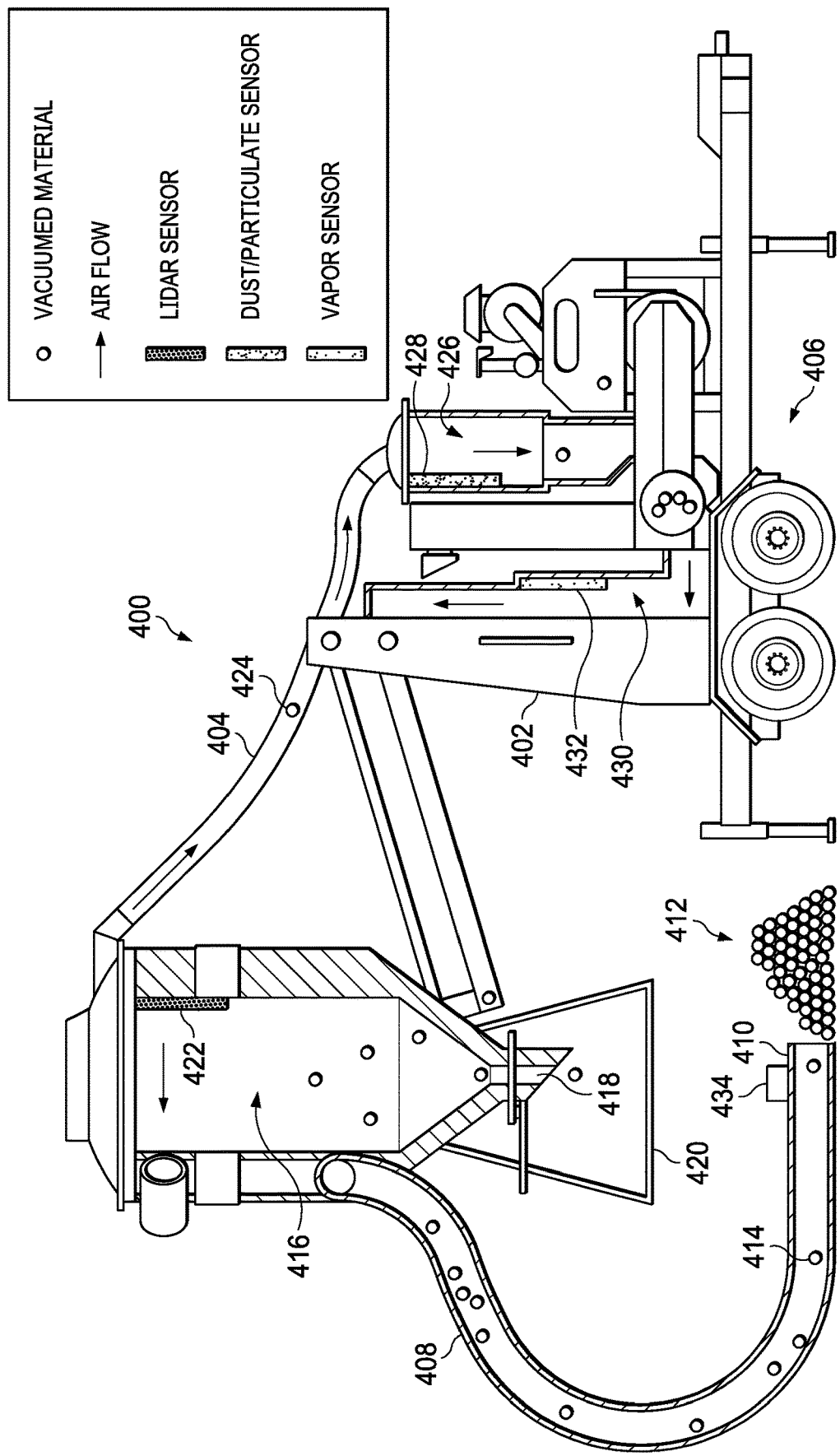
FIG. 4 shows another vacuum cleaning device, in accordance with one or more embodiments.
Figure 5:
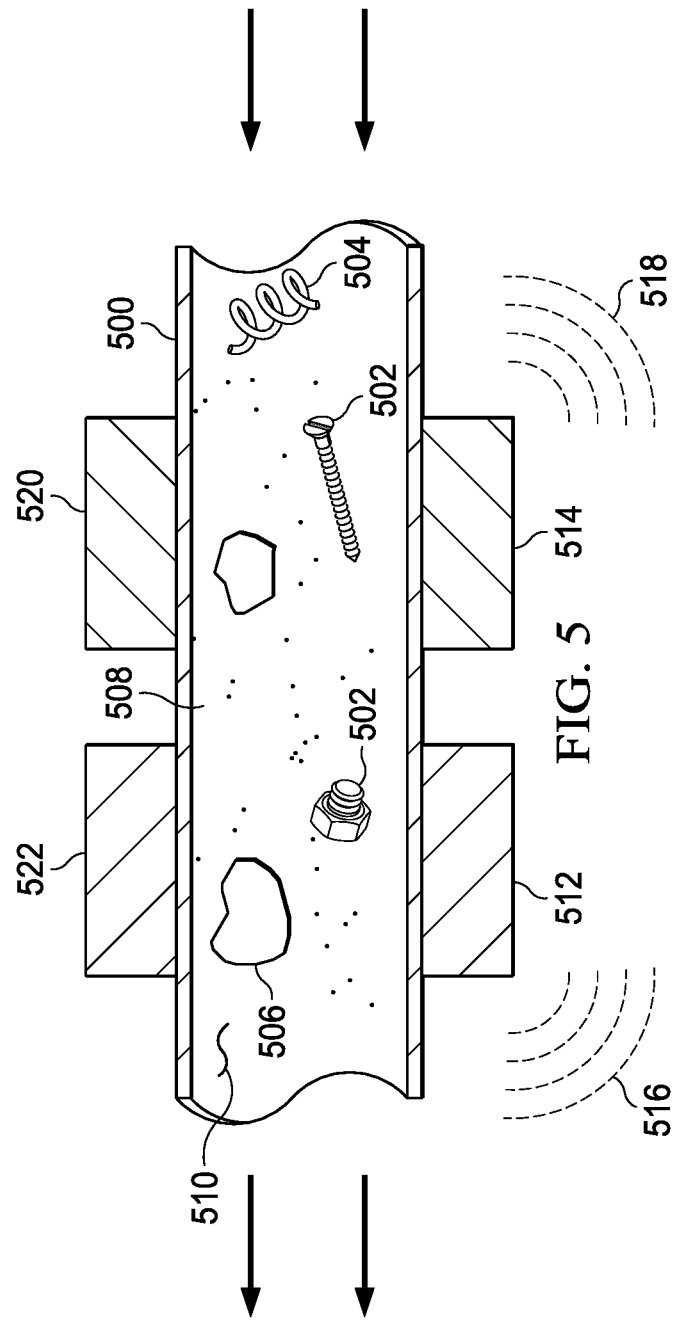
FIG. 5 shows an interior portion of the vacuum cleaning device of FIG. 4, in accordance with one or more embodiments.
Figure 6:
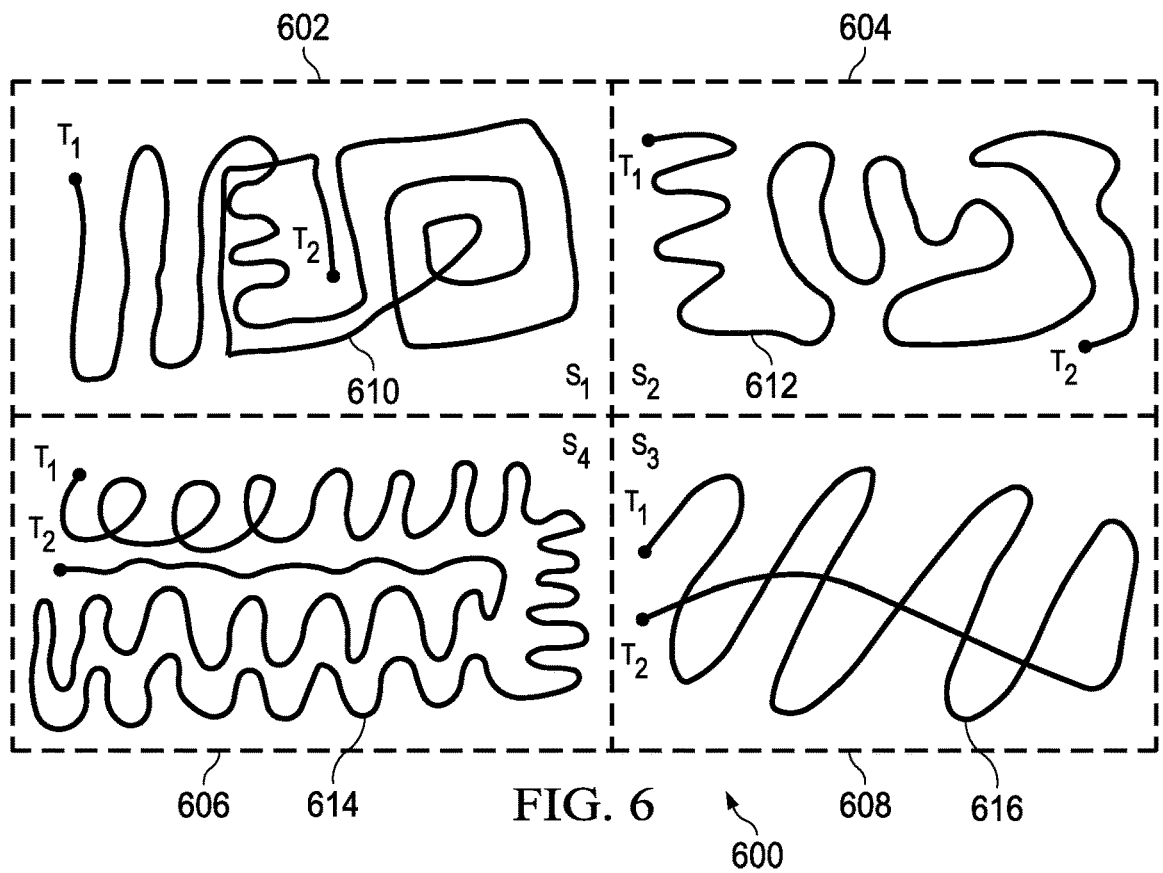
FIG. 6 shows example paths of one or more vacuum devices, in accordance with one or more embodiments.

FIG. 4 through FIG. 6 present a specific example of the techniques described above with respect to FIG. 1 through FIG. 3. The following example is for explanatory purposes only and not intended to limit the scope of the one or more embodiments.

Attention is first turned to FIG. 4. FIG. 4 shows another vacuum cleaning device, in accordance with one or more embodiments.

The vacuum machine (400) includes a negative pressure source (402) connected to a fluid line (404) through which air is sucked towards the negative pressure source (402). A propulsion system (406) may be used to move the vacuum machine (400) within an area.

A hose (408) forms part of the fluid line (404). A suction head (410) at the end of the hose (408) is used to pick up FOD (412).

Particles of the FOD (412), such as particle (414), travel through the hose (408) to a first stage (416) of FOD processing. At the first stage (416), the heavier particles of FOD are sorted and emptied via an ejection port (418) into a collection bin (420) for later processing. At the first stage (416), a LIDAR sensor (422) is used to measure the shape and size of the FOD particles for later data processing. In addition, high speed video may be taken of the FOD particles to further characterize and count the number of FOD particles. Multiple cameras with known parallax may be used to generate a three-dimensional model of the FOD. Imagers that use their own illumination can capture the three dimensional structure and reflectivity of the FOD. A low-flux imaging technique such as first-photon imaging, can be used with a computational imager that exploits spatial correlations found in real-world scenes to quantitatively assess the FOD particles and the flow of FOD particles.

Smaller FOD particles, such as FOD particle (424), are transported past the first stage (416) through the fluid line (404) to a second stage (426) for additional processing. At the second stage (426), a dust and particulate sensor (428) is used to sense parameters of the dust and particulate matter that is composed of the smaller particles, such as the FOD particle (424). The data taken by the dust and particulate sensor (428) will also be used for later data processing. A filter and/or a bag (not shown) may be used to collect the dust and particulate matter for later disposal or recycling. One use of the second stage (426) may be to collect particles of 2 mm in diameter or less.

The remaining FOD will be of microscopic particles which collectively may be referred to as vapor. The third stage (430) is used to collect the vapor into storage tanks and/or filters. A vapor sensor (432) may be used to collect data about the vapor for later data processing. For example, a volatile organic compound analyzer can measure various classes of carbon-containing chemicals that have a high vapor pressure at ambient temperature. Typical indoor sources of such chemicals include varnishes, paints, solvents, cleaning materials, etc. A photo-ionization detector (PID) may be used to identify and characterize the vapor FOD.

As indicated above, the various sensors mentioned with respect to FIG. 4 collect a variety of different parameters regarding a variety of different types of FOD. The FOD may be classified using the parameters, according to the techniques and devices described above with respect to FIG. 1 through FIG. 3. The classifications and other information can then be used in further data analysis, as likewise described with respect to FIG. 2A through FIG. 3.

In an embodiment, a position sensor (434) may be connected to the suction head (410) of the vacuum machine (400). The position sensor (434) measures a position of the suction head (410) relative to a known coordinate system for an area in which the vacuum machine (400) operates. The position information may be used as described with respect to FIG. 2A through FIG. 3.

Thus, in conjunction with a clock, then the suction head (410) allows, for a given time T, the determination a position, X, Y, Z, of the suction head (410) relative to a known coordinate system. The linear and circular errors 'e' of the measurement can be reported to improve awareness of positional accuracy.

Multiple position sensors such as position sensor (434) may be used. For each time position sensor, a reading R' may be taken that includes at least values for U, X, Y, Z, T, e. U represents a universal ID; X, Y, and Z are Cartesian coordinates, T is time, and e is the error of position measurement. Software running on a computer can utilize machine learning, deep learning, or artificial intelligence models to detect and report patterns in the captured and correlated data which would include a temporally-aware position of the vacuum cleaning device (100) or a portion of the vacuum cleaning device (100) and a temporally-aware window of time with a measured count of FOD.

In order to deliver a desirably accurate relative position of the position sensor (434), secondary support devices may be used. For example, the reported value of position can be in global positioning system (GPS) coordinates (longitude, latitude, mean sea level (MSL) elevation) or it can be relative to some pre-determined position with sub-meter accuracy.

Attention is now turned to FIG. 5. FIG. 5 shows an interior portion of the vacuum cleaning device of FIG. 4, in accordance with one or more embodiments. For example, the fluid line (500) shown in FIG. 5 may be either the fluid line (404) or the hose (408) of FIG. 4. FIG. 5 is presented to show that sensors may be placed not just at the stages, but within and around fluid lines or other portions of the vacuum machine.

FIG. 5 shows a variety of different types of FOD flowing along with the air sucked through the fluid line (500) by means of the negative pressure source. Relatively large FOD, such as the screw (502), the spring (504), and the scrap material (506) are shown, is mixed with dust and other particulate matter, such as particle (508). Vapor may also be present, as indicated by the curved line (510).

One or more sensors may be present. For example, first magnetometer (512) and second magnetometer (514) may be connected to the fluid line (500). As metal FOD, such as the screw (502) or the spring (504), passes by the magnetometers, changes in magnetic fields are induced. By measuring the time interval between the disturbance measured by the second magnetometer (514) and the first magnetometer (512), the speed of the FOD through the fluid line (500) may be assessed. The speed of the FOD may be used to calculate the efficiency of the negative pressures source and possibly the mass of the FOD, given known air resistance. Wireless communication devices, as indicated by lines (516) and lines (518) may be used to communicate the sensor data to a remote computer, including a computer located elsewhere on the vacuum machine.

Thus, FIG. 5 shows that the hose area or any area through all vacuum cleaner chambers may hold multiple sensors. In FIG. 5, a first sensor (i.e., the first magnetometer (512)) is a metal detector and counter that detects metallic debris of up to a known large size from a known small size and counts each debris object. Both sizes can be calibrated on such a sensor. A second sensor (i.e., the second magnetometer (514)) is an object detector and counter that count that detects any debris of up to a known large size from a known small size and counts each debris object. Both sizes can be calibrated on such sensors.

Other sensors may be present. For example, a positioning sensor (520) may be part of a positioning system that enables measurements of a precise location of an object in 3D space (X, Y, Z) relative to a known coordinate system. A clock (522) may measure points in time, T, to a desired level of accuracy.

The wireless communication device(s) can return a UUID (universally unique identifier) that uniquely identifies this device, as well as a timestamp, and a number N which is the number of debris detected in time segment, dT. The time segment, dT, can be constant or may vary slightly based on the accuracy of the measuring device. The device may return such values of T, dT, U and N at reasonably regular intervals that are equal to the value of dT returned for a specific reading and such that there is no window between two readings where a measurement is not taken. Thus, if the vacuum cleaner has a device to detect and count metal, a device to detect and count small FOD, then for each type of FOD (metallic and all FOD), the device may record a reading R with (U, T, dT, N). This data may then be returned for further processing, as described with respect to FIG. 2A through FIG. 3.

Attention is now turned to FIG. 6. FIG. 6 shows example paths of one or more vacuum devices, in accordance with one or more embodiments. FIG. 6 divides an area (600) into four stations: first station (602), second station (604), third station (606), and fourth station (608). The vacuum machine takes a first path (610) in the first station (602). The vacuum machine takes a second path (612) in the second station (604). The vacuum machine takes a third path (614) in the third station (606). The vacuum machine takes a third path (616) in the fourth station (608). Each path is different because each path is optimized to the category, frequency, location, and time of past FOD detection in each corresponding station, as described with respect to FIG. 2A through FIG. 3.

Figure 7:
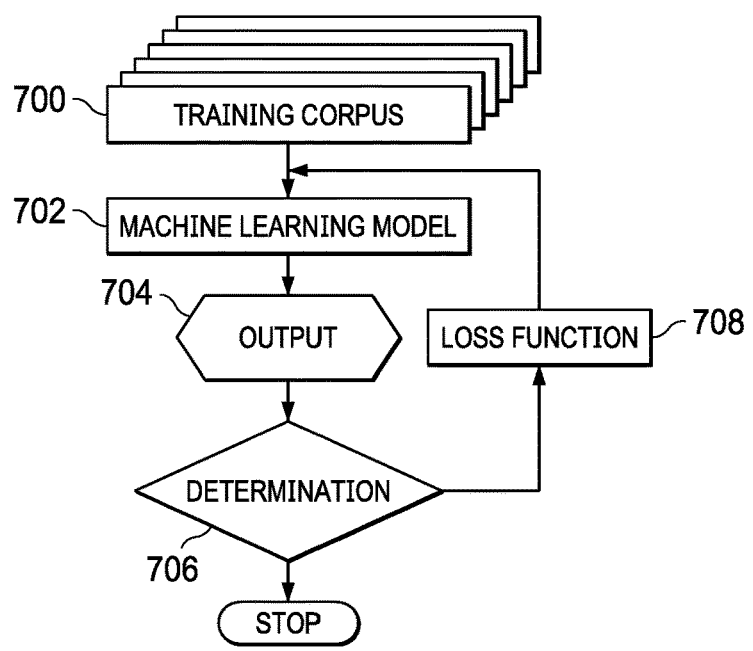
FIG. 7 shows a method of training a machine learning model, in accordance with one or more embodiments.

FIG. 7 shows a method of training a machine learning model, in accordance with one or more embodiments. The method of FIG. 7 may be used to train the machine learning model(s) described with respect to FIG. 1 through FIG. 3.

At step 700, a corpus is received, the corpus including FOD data which corresponds to known FOD types. Thus, the corpus may be referred to an annotated corpus. In other words, the computer scientist already knows what the final recommended FOD type should be, even before the machine learning model takes as input the known data and produces a calculated recommended action. The corpus may be received by a training application being executed by a processor.

At step 702, at least part of the corpus is input as a vector into a machine learning model. The machine learning model has several layers that perform a correlation between the available data and pre-designated FOD types. The corpus may be input as a vector by first embedding the corpus in the form of a vector. Embedding may be accomplished by another machine learning process or some other rule-based process, not described herein, which translates data in the corpus into numbers that form the values of the features in the vector.

At step 704, a probability is determined, based on the underlying data, for each of the pre-designated FOD category recommendations. The determination is performed by the layers in the machine learning model during execution of the machine learning model. The layers acting in concert assign a probability, which may be expressed as a number between zero and one, to one or more of the features in the vector. Those probabilities that exceed a threshold value, such as but not limited to 0.9, may be marked as a FOD of the corresponding type.

At step 706, a determination is made of whether the predicted FOD category corresponds to the known FOD category. If the predicted FOD category is the same as the known FOD category, then the process terminates.

At step 708, a loss function is calculated. The loss function is calculated by comparing and evaluating a difference between the recommended FOD category at output step 704, and the known FOD category. A weighted formula may be applied to the difference in some embodiments. The difference reflects an error in the machine learning model at step 702.

For example, the recommended FOD category may have been "metal fasteners". However, the computer scientist already knew that actual FOD category was "metal tool". Thus, the determination at step 706 is that an adjustment will be made to the machine learning model (at step 702) so that, in the next iteration of training, "metal tool" should be the recommended FOD category.

The difference in probability between the two FOD categories ("metal fasteners" and "metal tool") is the basis for calculating the loss function at step 708. The loss function itself is one or more commands to change one or more parameters of the machine learning model at step 702. The parameters change how the layers interact to form the probabilities described above. Thus, the result of applying the loss function at step 708 to the machine learning model at step 702 is to form a new or revised machine learning model.

The process is then repeated. The training corpus at step 700 is applied to the revised machine learning mode, the output is generated, and a determination is made whether the output matches the known result. The process continues to repeat until convergence has been achieved, whereupon the method of FIG. 7 terminates. Convergence occurs when, even after the loss function has been applied at step 708, the output of the machine learning model at step 704 no longer improves. Convergence also occurs when the output at step 704 exactly equals the known output.

Figure 8A:
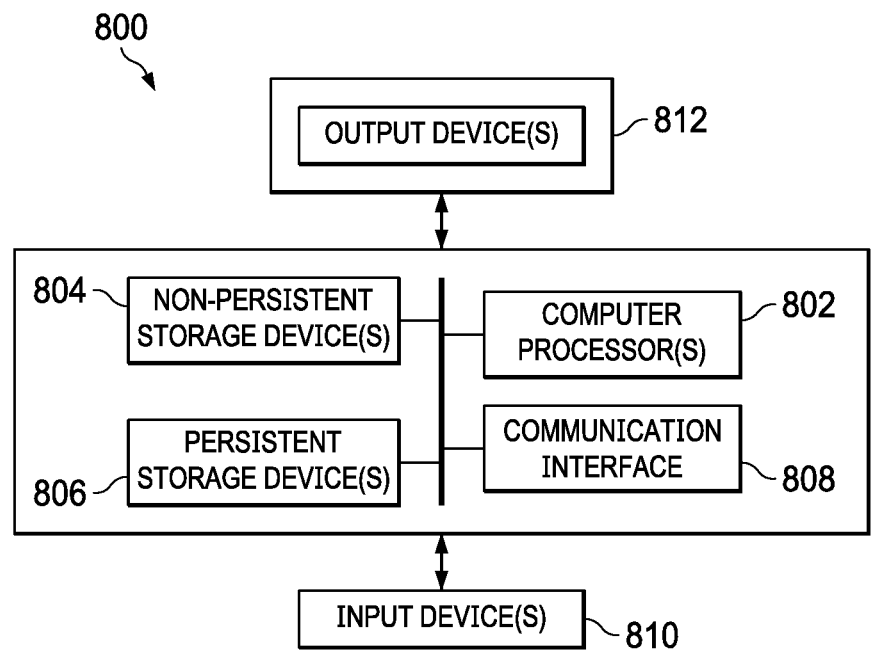
FIG. 8A and FIG. 8B show a computing system environment, in accordance with one or more embodiments.
Figure 8B:
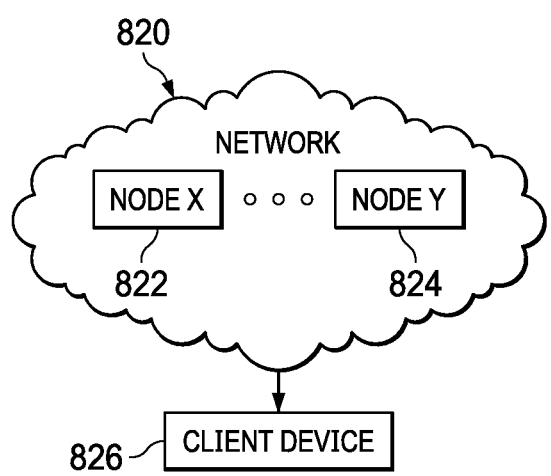

FIG. 8A and FIG. 8B are examples of a computing system and a network, in accordance with one or more embodiments. The embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 8A, the computing system (800) may include one or more computer processor(s) (802), non-persistent storage device(s) (804) (e.g., volatile memory, such as random access memory (RAM), cache memory), persistent storage device(s) (806) (e.g., a hard disk, an optical drive such as a compact disk (CD) drive or digital versatile disk (DVD) drive, a flash memory, etc.), a communication interface (808) (e.g., Bluetooth interface, infrared interface, network interface, optical interface, etc.), and numerous other elements and functionalities that implement the features and elements of the disclosure.

The computer processor(s) (802) may be an integrated circuit for processing instructions. For example, the computer processor(s) (802) may be one or more cores or micro-cores of a processor. The computing system (800) may also include one or more input device(s) (810), such as a touchscreen, a keyboard, a mouse, a microphone, a touchpad, an electronic pen, or any other type of input device.

The communication interface (808) may include an integrated circuit for connecting the computing system (800) to a network (not shown) (e.g., a local area network (LAN), a wide area network (WAN) such as the Internet, a mobile network, or any other type of network) and/or to another device, such as another computing device.

Further, the computing system (800) may include one or more output device(s) (812), such as a screen (e.g., a liquid crystal display (LCD), a plasma display, a touchscreen, a cathode ray tube (CRT) monitor, a projector, or other display device), a printer, an external storage, or any other output device. One or more of the output device(s) (812) may be the same or different from the input device(s) (810). The input and output device(s) (810 and 812) may be locally or remotely connected to the computer processor(s) (802), the non-persistent storage device(s) (804), and the persistent storage device(s) (806). Many different types of computing systems exist, and the aforementioned input and output device(s) (810 and 812) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments.

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system (800) shown in FIG. 8A, or a group of nodes combined may correspond to the computing system (800) shown in FIG. 8A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system (800) shown in FIG. 8A. Further, the client device (826) may include and/or perform all or a portion of one or more embodiments.

The computing system (800) or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing the one or more embodiments, may extract one or more data items from the obtained data. For example, the extraction may be performed as follows by the computing system ($800$) in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system ($800$) of FIG. 8A, while performing one or more embodiments, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system ($800$) in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (800) of FIG. 8A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (800) of FIG. 8A and the nodes (e.g., node X (822), node Y (824)) and/or client device (826) in FIG. 8B. Other functions may be performed using the one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A vacuuming device, comprising:
a sensor connected to at least a suction head, and is configured to sense a plurality of parameters of a plurality of different foreign object debris (FOD) in the suction head, the plurality of different FOD having a plurality of different sizes;
a positioning sensor connected to the suction head and configured to ascertain a position of the suction head within an area in which the vacuuming device is located; and
a computer in communication with the sensor and the positioning sensor, wherein the computer is programmed to:
classify a plurality of categories of the plurality of different FOD using the parameter,
use the position of the suction head to determine a plurality of pick-up locations of the plurality of different FOD,
record a plurality of locations in pre-defined sub-areas, within the area, where the FOD was vacuumed during an initial vacuuming of the area; and
optimize a path, for a subsequent vacuuming of the area after the initial vacuuming of the area, of the vacuuming device in the area that was previously vacuumed based on a combination of the plurality of locations in the pre-defined sub-areas and the plurality of categories of the plurality of different FOD already vacuumed during the initial vacuuming of the area.

2. The vacuuming device of claim 1, further comprising:
a robotic propulsion system configured to drive the vacuuming device; and
a control system configured to automatically follow a pre-determined path in the area while vacuuming the plurality of different FOD through the suction head.

3. The vacuuming device of claim 2, wherein the computer is further programmed also to use the plurality of pick-up locations in combination with the plurality of parameters to classify the plurality of categories of the plurality of different FOD.

4. A method comprising:
vacuuming an area substantially entirely using a vacuum machine so as to pick up plurality of different foreign object debris (FOD) into the vacuum machine, the plurality of different FOD having a plurality of different sizes;
sensing, with a sensor of the vacuum machine, a plurality of parameters of the plurality of different FOD;
identifying, a plurality of categories of the plurality of different FOD based on the plurality of parameters;
reporting the plurality of categories of the plurality of different FOD;
recording a plurality of locations in pre-defined sub-areas, within the area, where the plurality of different FOD was vacuumed;
completing an initial vacuuming of the area;
optimizing a path, for a subsequent vacuuming of the area after the initial vacuuming of the area, of the vacuuming machine in the area that was previously vacuumed based on a combination of the plurality of locations in the pre-defined sub-areas and the plurality of categories of the plurality of different FOD already vacuumed during the initial vacuuming of the area, to generate an optimized path; and
performing, by the vacuum machine, the subsequent vacuuming of the area using the optimized path.

5. The method of claim 4, further comprising:
recording a plurality of locations in the area where the plurality of different FOD was vacuumed; and
determining, based on the plurality of categories and the plurality of locations of the plurality of different FOD, a future path of the vacuum machine within the area.

6. The method of claim 4, further comprising:
identifying a plurality of stations within the area where the plurality of different FOD was vacuumed; and
adjusting an automatic path of the vacuum machine with respect to the plurality of stations.

7. The method of claim 4, further comprising:
recording locations where the plurality of different FOD was vacuumed within the area; and
generating a heatmap for the area, wherein the heatmap represents the pre-defined sub-areas within the area where the plurality of different FOD was vacuumed.

8. The method of claim 7, further comprising:
displaying the area on a display device; and
highlighting, on the display device, at least one of the pre-defined sub-areas based on the plurality of categories of the plurality of different FOD or a frequency of the plurality of categories of the plurality of different FOD occurring within the area or at least one of the pre-defined sub-areas.

9. The method of claim 4, further comprising:
distinguishing, during vacuuming, between waste objects and non-waste objects.

10. The method of claim 9, further comprising:
separating, within the vacuum machine using a separator, the waste objects and the non-waste objects.

11. The method of claim 10, further comprising:
placing, by the vacuum machine, the waste objects in a receptacle attached to the vacuum machine; and
ejecting the non-waste objects from the vacuum machine.

12. The method of claim 4, wherein:
the sensor comprises a light detection and ranging (LiDAR) sensor, and
the plurality of parameters comprises at least both the plurality of different sizes and a plurality of three-dimensional images of the plurality of different FOD as the plurality of different FOD moves within the vacuum machine.

13. The method of claim 4, wherein
the sensor additionally comprises an infrared (IR) sensor and a chemical sensor,
the plurality of parameters additionally comprises an infrared image of the plurality of different FOD as the plurality of different FOD moves within the vacuum machine, and
the plurality of parameters additionally comprises a chemical detected by the chemical sensor.

14. The method of claim 4, wherein the plurality of parameters is taken from an image of the plurality of different FOD inside the vacuum machine, and wherein identifying the plurality of categories of the plurality of different FOD comprises:
inputting a vector, comprising a data structure that includes the plurality of parameters, into a machine learning model (MLM) comprising a deep learning neural network comprising a multi-layer perceptron;
extracting, using the MLM, features from the image using small squares within the image.

15. The method of claim 14, wherein:
the MLM comprises a plurality of convolution layers, a plurality of pooling layers, and a plurality of fully connected layers;
the plurality of convolution layers and the plurality of pooling layers together perform extracting the features; and
the plurality of fully connected layers classify the plurality of different FOD based on the plurality of parameters.

16. The method of claim 14, further comprising:
training the MLM by performing additional operations comprising:
receiving a training image comprising known FOD;
inputting the training image into an untrained MLM;
generating an output classifying FOD in the training image based on the plurality of parameters;
comparing the output to the known FOD;
generating a loss function based on a difference between the output and the known FOD;
modifying the untrained MLM; and
repeating, until convergence, inputting, generating the output, comparing, generating the loss function, and modifying.

17. The method of claim 4, wherein classifying comprises:
comparing the plurality of parameters to a library of parameters; and
assigning the plurality of categories to the plurality of different FOD based on a closest match of the plurality of parameters to a plurality of entries in the library.

18. A method, comprising:
vacuuming an area using a vacuum machine, wherein:
the vacuum machine comprises a negative pressure source, a vacuum head connected to the negative pressure source, and a sensor connected to the vacuum machine,
vacuuming picks up foreign object debris (FOD) into the vacuum machine, and
the area comprises a plurality of stations at which a corresponding plurality of machines generate at least a portion of the FOD;
sensing, with the sensor, a parameter of the FOD;
formatting the parameter as a data structure;
identifying, using a computer analyzing the data structure, a category of the FOD;
recording, using the computer, a location of the FOD;
receiving, using the computer, data describing the plurality of stations; and
identifying, using a combination of the category of the FOD, the location of the FOD, and the data describing the plurality of stations, a first station within the plurality of stations for evaluation of a modification to an operational procedure performed by
a first machine, of the corresponding plurality of machines,
the first machine located at the first station, and
the modification comprising a change to production of at least some of the FOD produced by the first machine.

19. The method of claim 18, further comprising:
after identifying the first station, modifying production of FOD at the first station by modifying the operational procedure performed at the first station.

20. The method of claim 18, further comprising:
recording a plurality of locations in pre-defined sub-areas, within the area, where the FOD was vacuumed; and
optimizing a path of the vacuuming machine in the area based on a combination of the plurality of locations and the category of the FOD.

* * * * *